United States Patent Office 2,978,252
Patented Apr. 4, 1961

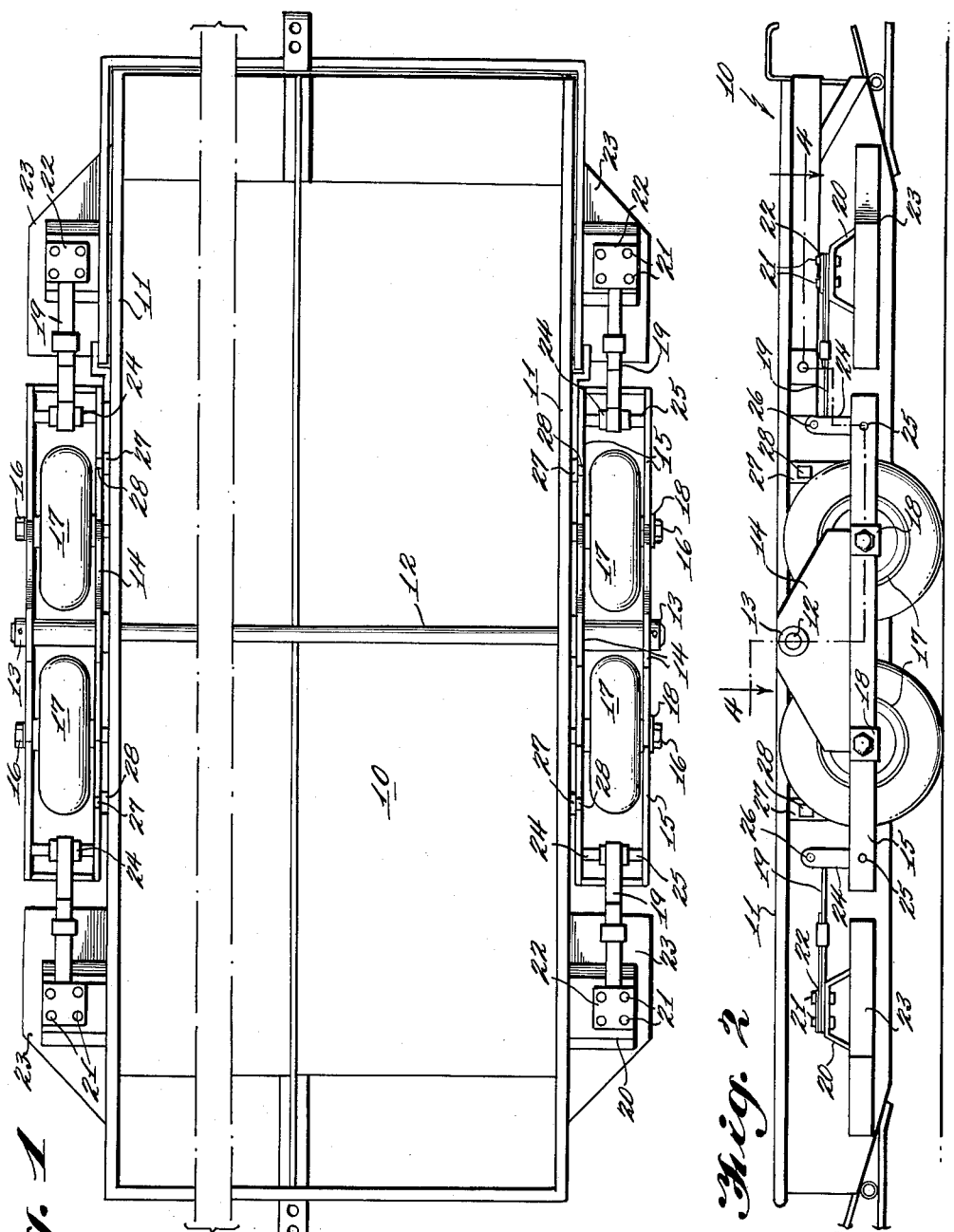

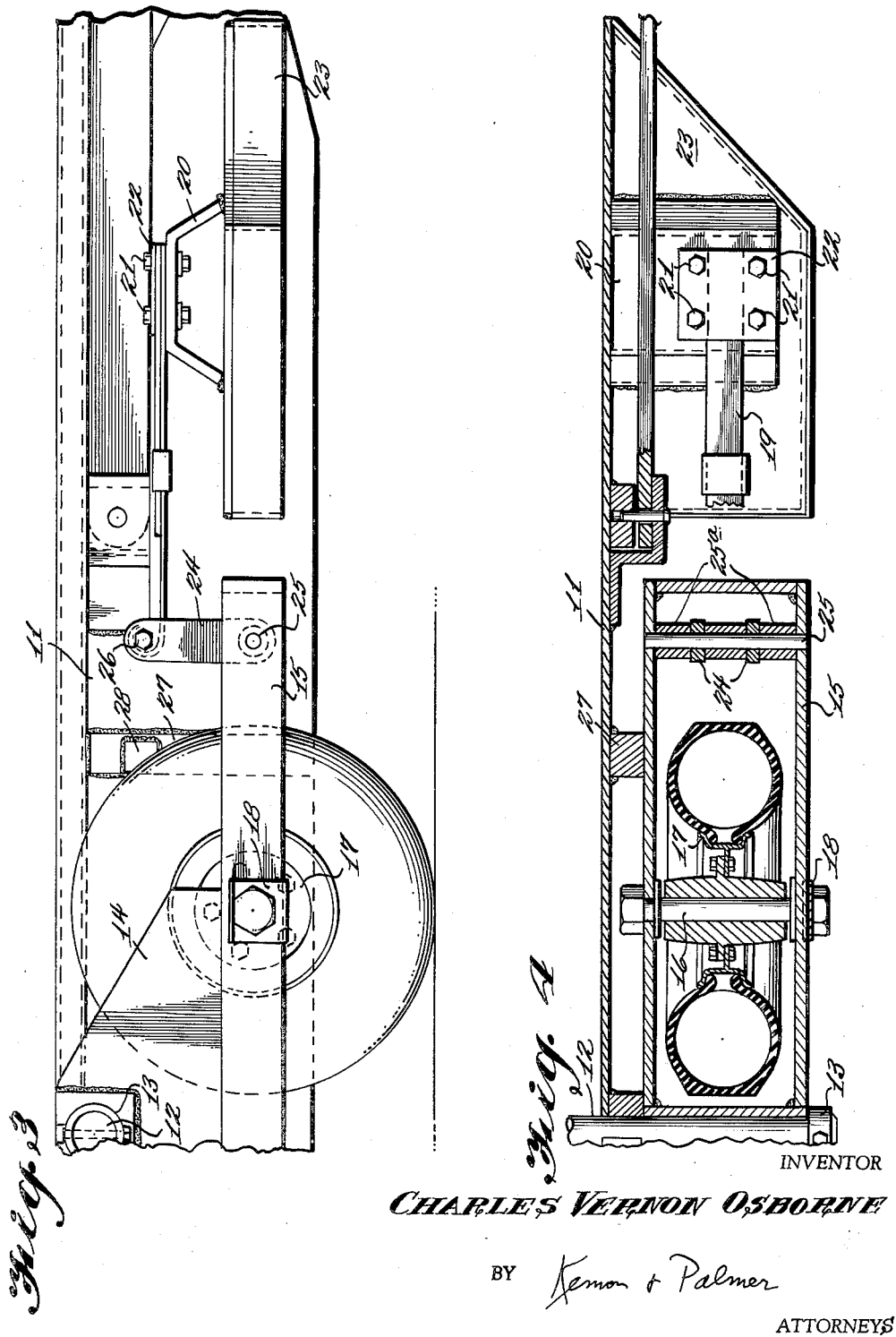

2,978,252

SUSPENSION SYSTEM FOR LAND WHEELED VEHICLES

Charles Vernon Osborne, Wise, Va.

Filed Aug. 19, 1957, Ser. No. 678,974

6 Claims. (Cl. 280—79.2)

This invention relates to cars for conveying bulk material such as ore, coal, sand or the like, and more particularly, to suspension systems for such cars.

In many industries such as, for example, mining, quarrying and in some instances, earth moving, it is the practice to use trains of relatively small individual cars or vehicles to convey material from diverse points of digging to control loading stations where the material is transferred to larger and more efficient means of transportion. The cars used for this practice, commonly called "mineral cars," must necessarily be capable of carrying heavy loads under extremely poor hauling conditions due to the generally rough characteristics of the ground over which the material must be hauled. A very common and well known technique employed to overcome this difficulty is the use of temporary railed tracks and mineral cars equipped with railway wheels to permit full capacity loading of the cars. The laying of such tracks, however, is costly and time-consuming, thus to detract from the efficiency of the hauling operation.

In recent times, cars equipped with wheels having pneumatic tires thereon have been introduced to these industries to circumvent the expense and inefficiency of laying temporary railed tracks. In cars of this type heretofore constructed, the wheels have been rigidly associated with the car load supporting bed in order to attain sufficient strength needed to stand up under the heavy loading and poor hauling conditions to which the car is subjected. This rigid connection of wheels to the car bed results in considerable swaying, lurching and bouncing of the car during the hauling operation, which actions create severe wear on the tires, wheels, couplings between cars, and tend generally to reduce the useful life of the car. Moreover, these faulty actions induce forces on the "motor" or tractor unit drawing the cars, resulting in difficult steering and unsymmetrical loading on this unit.

An object of this invention is to provide a car of the type referred to, which will overcome the difficulties encountered with prior constructions.

Another object of this invention is that of providing a suspension system for such a vehicle by which the vehicle bed is directly supported by wheels without transmitting forces acting upon the wheels to the bed and other structures associated with the bed.

A further object of this invention is the provision of a tandem wheel unit for cars of the type referred to, in which the load carrying bed is suspended in pendulum fashion from brackets associated with the wheel units.

Another object of this invention is to provide a pendulum suspension system for bulk material hauling cars equipped with tandem wheels in which oscillatory action of the car bed about a pivotal axis located above and between the wheel axles of the tendem pairs is damped by cushioning means.

A further object of this invention is the provision of a suspension system of the type referred to, in which the oscillatory movement of the vehicle car bed through cushioning means is limited by positive stops.

These and other objects will be obvious from the following detailed description read in conjunction with the attached sheets of drawing in which:

Fig. 1 is a fragmentary plan view of a mineral car incorporating the suspension system of this invention;

Fig. 2 is a side elevation of the construction shown in Fig. 1;

Fig. 3 is an enlarged fragmentary side elevation of the construction shown in Fig. 2;

And Fig. 4 is an enlarged fragmentary sectional plan view taken at line 4—4 in Fig. 2.

In general, the objects of this invention are achieved by suspending the load carrying body of a mineral car or like vehicle from a shaft component extending transversely of the body and vertically over its center of gravity, which shaft component is in turn supported by tandem wheels positioned on each side of the body so that the body is suspended in pendulum fashion on the wheels.

Referring now to the drawings, a mineral car bed generally designated by the numeral 10 and equipped with side walls 11, is shown mounted on a preferred construction of the suspension system to which this invention is directed. It is to be understood, however, that the mineral car bed shown is for illustrative purposes only, and that the suspension system of this invention may be readily adapted for use on other type vehicles. The bed is suspended from a shaft 12, which extends transversely through the side walls 11 and is secured thereto. The shaft 12 lies in a vertical plane which passes through the center of gravity of the bed 10. Also, the shaft is connected to the side walls 11 at points above the bed center of gravity, so that the entire bed is suspended from the shaft in pendulum fashion. The ends of the shaft 12 are rotatably secured in sleeves 13, which are in turn secured to upstanding gusset plates 14. The gusset plates are mounted on rectangular frames 15 disposed on each side of the bed 10. On each of the frames are mounted a pair of axles 16 arranged one behind the other or in tandem fashion in a manner such that each axle is equally spaced from the center of gravity of the car bed 1. Wheels 17 of any well known variety equipped with pneumatic tires are journaled on the respective axles. Metal tabs 18 are provided to maintain the axles 16 in a keyed or locked position on the frames 15.

At this point, it becomes obvious that the entire weight of the bed 10 is pivotally suspended on the tandem wheels about the axis of the shaft 12. An advantage of this construction is that the static load of the bed and material being hauled therein is directly and rigidly supported by the wheels 17. However, an outstanding feature of this construction is that only vertical components of forces originating in the wheels are transmitted to the bed, and conversely, only vertical components of forces originating in the bed are transmitted back to the wheels. All other forces developed in either the bed or the wheels are dissipated in the form of oscillatory or pendulum-like movement of these members about the pivotal axis of the shaft 12. In addition, it will be noted that these results are obtained without in any way jeopardizing the compactness of the car. This is possible since the axis of the shaft 12 is elevated sufficiently above the axle to enable the use of wheels having radii less than the vertical distance between the axles and the top of the body.

For the purpose of stabilizing the oscillatory movement of the bed 10 about its central transverse axis with respect to the wheels 17 and rectangular frames 15, resilient leaf springs 19 are operably connected between the ends of the frame 15 and the bed 10. While the leaf spring construction is a preferred arrangement, it is to be understood that other devices could be substituted, such as, for example, pneumatic or hydraulic cushioning means. As best shown in Fig. 3, the springs 19 are cantilevered from brackets 20 by the provision of bolts 21 extending through holes in the bracket 20 and clamp plates 22. The brackets 20 are welded or otherwise secured to angle iron guard rails 23. In addition to performing the function of a support for the leaf springs, the guard rail 23 also serves to prevent the car bed from being damaged by obstacles which may be incurred when the vehicle is being used. The cantilevered or overhanging end of the springs 19 are attached to one end of each of the frames 15 by links 24, which are pivotally associated with pins 25 and 26 in the frame and spring, respectively. As shown in Fig. 4, bushings 25a are provided to retain the links 24 spaced evenly on pins 25 and with respect to the frames 15.

Another feature of this invention is that means are provided for positively limiting movement of the rectangular frames 15, and thus the wheels 17 are supported thereon with respect to the bed 10, both pivotally about the shaft 12 and axially of this shaft or transversely of the bed. To restrict lateral or transverse movement of the tandem wheel units with respect to the bed, rub rails 27 are secured to the exterior of the bed side walls 11, so as to be disposed between the side walls and the frame 15. These rub rails extend over substantially the height of the side walls of the bed, and are of sufficient thickness to substantially bridge the gap formed between the side walls and the frame members 15. Near the top of each rub rail 27 there is secured a laterally projecting lug 28. These lugs serve the important function of limiting by a predetermined amount, the angular movement of the frames about the axis of shaft 12. It is obvious that the amount of angular displacement permitted is established by the height of the lugs 28 above the frames 15 when the bed and frames are both in a horizontal position. Thus, the danger of bending the springs 19 beyond their elastic limits is eliminated.

In practice, a vehicle incorporating the suspension system of this invention is connected in a train of such vehicles and drawn by a tractor or other wheeled power source. Since the center of gravity of the bed 10 and the load in the car is below and in vertical alignment with the main support shaft 12, the bed acts as a pendulum and retains a horizontal position regardless of the rises and dips which are encountered by the wheels riding over rough terrain. This operational characteristic tends to minimize the stresses placed on the latches interconnecting the individual vehicles in the train and thus to prevent stresses and strains originating in one of the individual vehicles from being transmitted to another. Further, the spring cushioning means 19 operably associated with the tandem wheel frames 15 and the bed side walls 11 distribute stresses from the wheels equally throughout the entire vehicle body. Moreover, because of the pivotal arrangement between the tandem wheel units and the bed, this function of shock absorbing is performed without sacrificing the vertical load supporting strength of the system.

From the foregoing, it will readily be observed by one familiar with this art that by this invention there is provided a suspension system particularly suitable for cars adapted to haul heavy loads of loose, bulky material over extremely hazardous hauling conditions without sacrificing the load carrying strength of such a car.

Since many possible changes may be made in this invention, and since many changes may be made in the embodiments hereinbefore set forth without departing from the spirit of this invention, it is to be distinctly understood that the foregoing describes a preferred embodiment and applicant claims the benefit of a full range of equivalents within the scope of the appended claims.

I claim:

1. A land wheeled vehicle for conveying bulk material comprising: a load-carrying body of substantial depth; means engaging and pivotally supporting said body about a transverse axis lying vertically above the center of gravity of said body; frame means positioned on opposite sides of said body; tandem axles in each of said frame means; wheels rotatably received on said axles; said means engaging and pivotally supporting said body being carried on said frame means with the pivotal axis thereof disposed in a vertical plane midway between said tandem axles and elevated above the level of said axles an amount sufficient to permit the radii of said wheels to be less than the vertical distance from said axles to the top of said body.

2. The combination as defined by claim 1 including resilient connections between said frame means and the body of the vehicle.

3. The combination as defined by claim 2 including rub-rails mounted on the vehicle body, said rub-rails positioned between the sides of body and said frame means whereby relative lateral movement of the body and said frame means is positively limited.

4. The combination as defined by claim 3 including stop means on said rub-rails for limiting relative oscillatory movements of the body and said frame means.

5. A suspension system for land wheeled vehicles having a load carrying body of substantial length and depth, the side walls of which lie in vertical planes parallel to the longitudinal axis of the bed, comprising: a shaft engaging the side walls, the axis of said shaft lying on a line passing transversely over the center of gravity of the vehicle bed and lying in the same vertical plane therewith; frames positioned on each side of the vehicle bed; tandem axles mounted in said frame; pneumatic tire wheels rotatably supported on said axles; upstanding gusset plates on said frames having journals therein for rotatably supporting said shaft; rub-rails mounted on the body side walls for limiting lateral movement of said frames with respect to the body; laterally projecting stops on said rub-rails for positively limiting the degree of oscillation of the body about the axis of said shaft with respect to said frames; and means resiliently connecting said frames to the body, said means including a resilient cushion and a mechanical linkage whereby limited oscillatory movements of said bed about the axis of said shaft are damped with respect to movements of said wheels.

6. A land wheeled vehicle comprising: a load carrying body of substantial depth; frame members positioned on opposite sides of said body; tandem wheels mounted within and supporting said frames; upstanding plates mounted on said frames; shaft means journaled in said plates for suspending said body about a transverse axis lying vertically over the center of gravity of said body; vertical rub-rails secured to said body between the exterior surfaces thereof and said frame members; laterally projecting stop members on said rub-rails for positively limiting relative oscillatory movement of said body and said frames about the axis of said shaft means; and resilient leaf springs connecting the ends of said frames to said body whereby the limited oscillatory movements of said body relative to said frames are equally damped.

References Cited in the file of this patent

UNITED STATES PATENTS

| | | |
|---|---|---|
| 308,933 | Tiffany | Dec. 9, 1884 |
| 675,541 | Butler | June 4, 1901 |
| 1,842,074 | Davis | Jan. 19, 1932 |
| 1,950,175 | Hick | Mar. 6, 1934 |
| 2,080,123 | Francis | May 11, 1937 |
| 2,091,090 | Bigley | Aug. 24, 1937 |
| 2,166,135 | Fletcher | July 18, 1939 |
| 2,288,246 | Kuester | June 30, 1942 |
| 2,589,948 | Marshall | Mar. 18, 1952 |
| 2,848,245 | Georgi | Aug. 19, 1958 |